May 12, 1942. S. G. TILDEN 2,282,439

AUTOMOBILE BRAKE

Filed Sept. 21, 1939

INVENTOR.
Sidney G. Tilden
BY C. P. Goepel
his ATTORNEY

Patented May 12, 1942

2,282,439

UNITED STATES PATENT OFFICE 2,282,439

AUTOMOBILE BRAKE

Sydney G. Tilden, Stewart Manor, N. Y.

Application September 21, 1939, Serial No. 295,844

2 Claims. (Cl. 188—78)

This invention relates to automobile brakes, and has for its objects to provide an improved friction facing segment to be used with brake shoes of known construction now in use.

It has been the practice in the art to design and construct automobile brakes using brake shoes which are faced with a friction material (brake lining) and which operate against a cylindrical brake drum. Such brake shoes may either contract upon the external surface of the drum, or may expand against the internal surface of the drum. The friction material facing has always been of uniform thickness throughout its length, and is usually attached to the brake shoes by means of countersunk flat head rivets or bolts of brass, copper or aluminum. The surface of the brake shoe to which the friction facing is attached, is an arc of a circle, and when the shoe is assembled in the brake in the applied position, this surface is concentric with the circle formed by the braking surface of the brake drum and is of a smaller radius than the drum by the thickness of the friction facing selected, the centers of curvature of the brake drum and brake shoe being coincident. Thus the segment of friction material, considered by itself, has concentric inner and outer arcs. If the brake is of an internal expanding type, the inner arc is of the same radius as the exterior surface of the brake shoe to which the facing is to be attached, and the outer arc is of the same radius as the braking surface of the brake drum. If the brake is of an external contracting type, the outer arc is of the same radius as the brake shoe, and the inner arc is of the same radius as the brake drum.

In order to secure longer service between replacements of such friction segments, the use of an oversize or thicker segment was attempted, but this resulted in an improper curvature, since the radius of the braking surface of the segment was automatically increased by the added thickness of the segment and its curvature could no longer be made to coincide with the curvature of the braking surface of the brake drum. Because of this improper curvature, the segment would contact the brake drum only at its ends. Therefore with uniform thickness friction segments, the thickness of the segment must be limited to the difference between the radius of the unlined brake shoe and the radius of the braking surface of the brake drum. The present invention consists of constructing a friction facing segment which is oversize or thicker in the center portion between the ends which is the point of greatest wear, and yet retains the proper curvature of both brake shoe and brake drum, to replace the standard thickness segment designed to be used. My oversize thickness segment corresponds in longitudinal section to a truncated lune and is formed so that one surface of the segment has the same radius of curvature as the braking surface of the brake drum; the other surface of the segment has the same radius of curvature as the segment surface of the brake shoe; and the centers of these curvatures are not coincidental but have been displaced by an amount equal to the added or oversize thickness of the segment. With my improved friction material segment, having eccentric inner and outer arcs, the increased thickness at the center portion where most wear occurs, is limited only by the means provided in the brake assembly to allow the brake shoes to be released or moved away from the brake drum.

The invention will be more fully described hereinafter, embodiments thereof shown in the drawing, and the invention will be finally pointed out in the claims.

In the accompanying drawing.

Similar characters of reference indicate corresponding parts throughout the various views.

Figure 1:
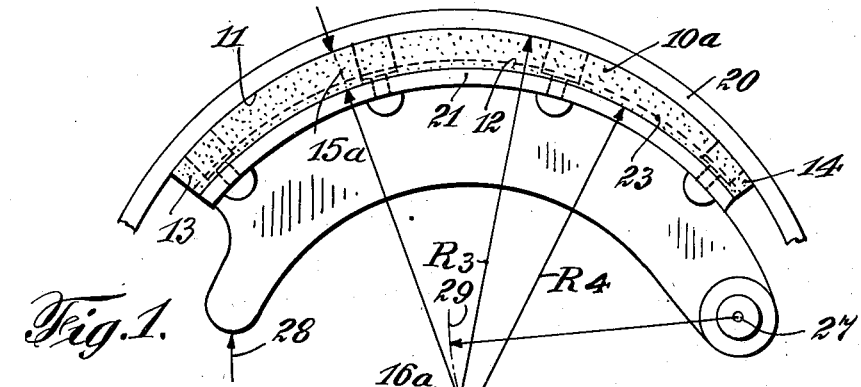
Figure 1 is a side view of a brake shoe and brake drum with my improved brake lining therein.
Figure 2:
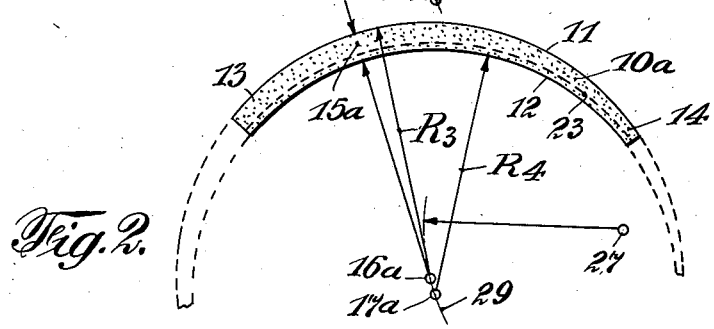
Figure 2 is a side view of an improved segment for brakes of the fixed anchor type separate from the brake drum and shoe shown in Figure 1.
Figure 3:
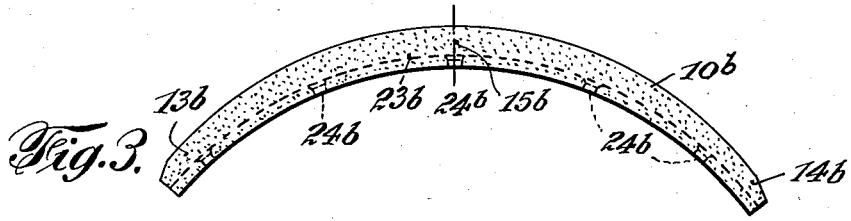
Figure 3 is a side view of a segment embodying the invention, with radii of unequal length, but made truncated symmetrically with the toe and heel ends of equal thicknesses, and the central portion of greatest thickness, this form being adapted for use with the type of brake when other than fixed anchor means are used, the centers of curvature being non-coincident.

Referring to the drawing, and more particularly to Figures 1 and 2, in Figure 1 is shown in side view a segment 10a adapted for use with brake shoes of the fixed anchor type which swing around a pivot in which the outer curved surface 11 which faces the brake drum 20 has the same curvature as the interior surface of the brake drum, the center of curvature being at 16a. The inner curved surface 12 of the segment 10a has the same curvature as the outer surface of the brake shoe 21, and fits over the same. The center of curvature of the curved surface 12 is at 17a. The maximum thickness of the initial segment is at 15a, and the segment tapers to its toe end 13 and to its heel end 14. The radii of curvature $R_3$ and $R_4$ are of unequal length differing by an amount equal to the thickness of the original standard size segment. The centers of curvature 16a and 17a are non-coincident and are displaced along the arc 29 having its center 27 coincident with the anchor pin of the brake shoe and around which the brake shoe rotates when the brakes are applied, by an amount equal to the added or oversize thickness of the segment. In Figure 3, a segment 10b is adapted for use with brake shoes of other than fixed anchor type in which the brake shoes are connected together by adjustable links, known and not shown, and has its maximum initial thickness at the center, with the toe 13b and heel 14b ends of substantially equal and less thickness. The centers of curvature are non-coincident, and are displaced radially by an amount equal to the added or oversize thickness of segment.

Each of the forms of Figures 1 and 2 has holes 24, as shown in Figure 3, for the passage of rivets or other fastening means. The line 23 in Figure 1 and the line 23b in Figure 3, each indicates an imaginary safety line beyond which the material should not be worn, since the peripheral surfaces of the heads of the fastening means are disposed substantially tangent to said safety line, and further use would expose the heads of the fastening means and permit them to contact the brake drum. This safety line or circumferential arc 23 has a centre of curvature at 17a which centre coincides with the centre 17a of the brake shoe 21 and the radius of which safety line or arc 23 is less than the radius $R_3$ of the inside surface 11 of the brake drum 20. The outer surface of the brake shoe 21 is indicated by 12. The brake shoe is pivotally movable on point 27. The force pushing the shoe 21 is indicated by the arrow 28. The segments are of a relative width as shown, the length and width of such segments varying and being known to the art.

The novel brake segment shown in Figures 1 and 2 is based upon a theory of construction different than that heretofore used. It was heretofore customary to have the centers of curvature of the inner and outer surfaces of the segment initially coincident, and the difference in length of radii between the brake shoe and the brake drum determined the thickness of the segment.

Figures 4, 5:
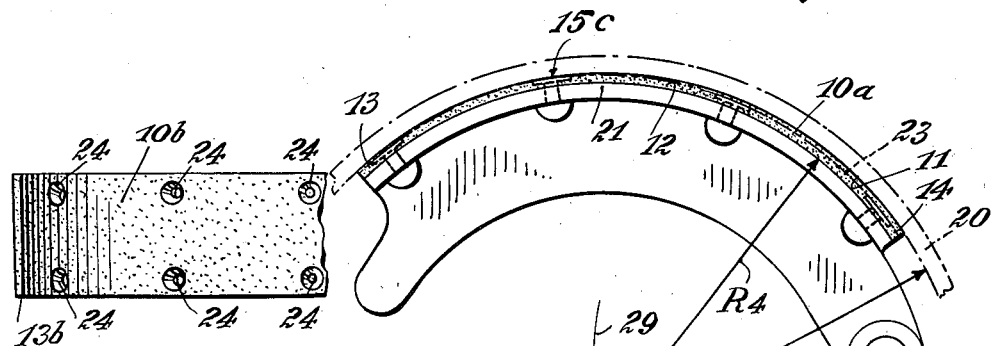
Figure 4 is a plan view of a brake segment showing the holes for the rivets or other fastening means.
Figure 5 is a side view of the segment when completely worn.

A completely worn segment is shown in Figure 5, in which the centers 27 and 16a remain as in Figure 1. The center 17a moves up along arc 29 until rivet line 23 is tangent to 11 at approximately 15a. The length of $R_3$ and $R_4$ remain unchanged in respect to Figure 1. The amount of the added size of the lining, is equal to an amount equal to the difference between the greatest thickness of the segment and the radii differential.

The radius differential is the thickness of the standard size segment. When a thicker segment is desired, the centers of curvature of the shoe and drum must be displaced by an amount equal to the added thickness of the segment. Thus, as stated in the claims the centers of curvature of the lining or segment are displaced by an amount equal to the difference between the greatest thickness of the segment and the standard size segment which as explained, is the same as the radii differential.

By forming a segment symmetrically and embodying the foregoing principle of construction of the novel oversize segment, a segment having a side contour such as shown in Figure 3 results. The maximum thickness is at 15b with the toe 13b and heel 14b of less thickness. Openings 24b are for the rivets. This form of segment is provided for use in brakes not having a fixed anchor. The centers of curvature of the inner and outer surfaces of the segment are non-coincident, and are displaced by an amount equal to the added or oversize thickness of the segment.

The advantage of this novel brake segment over the present art is that the brake segment is oversize where it wears most, and thus renders longer service.

To distinguish further from the art, it is seen from the foregoing that the prior art produced brake linings or segments whose inner and outer curved surfaces were initially concentric, the initial concentricity being due to the centers of curvature of the inner and outer curved surfaces being coincident; whereas in the improved oversize brake lining or segment the inner and outer curved surfaces of the segment are eccentric forming a segment that is lunular in side contour as a result of the centers of curvature of the inner and outer surfaces being non-coincident, and displaced by an amount equal to the added or oversize thickness of the segment.

While I have described my invention as particularly applicable to automobile brakes, it is, of course, clear that the invention is also applicable to brakes used in other vehicles, or in airplanes or other uses as stationary and industrial machinery brakes.

I have described several embodiments of my invention, but it will be clear that changes may be made within the principle of the invention described, without departing from the scope of the subjoined claims.

What I claim is:

1. In a brake having a cylindrical brake drum, a brake shoe, adapted to operate within and towards the inside of the brake drum; a friction material segment adapted to be attached to the brake shoe and, when attached, interposed between the brake shoe and the brake drum, and to operate against the brake drum in frictional contact, and fastening means for attaching the friction material segment to the brake shoe, the extripetal surfaces of said fastening means being disposed tangentially to a circumferential arc the centre of which coincides with the centre of curvature of the brake shoe, and the radius of which is less than the radius of the brake drum, the outer curved surface of said friction material segment being of the same radius as that of the brake drum, and the inner curved surface being of the same radius as that of the brake shoe, the radius of the outer curved surface and that of the inner curved surface differing in that the inner curved surface has a smaller radius than the outer curved surface, the centre of curvature of the outer and inner curved surfaces being displaced eccentrically by an amount equal to the difference between the greatest thickness of the segment and the said radius differential, whereby said segment, in its initial condition in respect of the drum has inner and outer curved surfaces eccentric to each other with the greatest thickness at the central portion, and said segment when the shoe is in its final position in respect of the drum, will have eccentric inner and outer curved surfaces and will be thicker at the ends than at the central portion.

2. In a brake having a cylindrical brake drum and a brake shoe adapted to operate within and toward the inside of the brake drum with a gap therebetween in the initial position of the brake shoe in respect to the brake drum the combination therewith of a friction material segment filling said gap and of uneven thickness throughout its length being thicker at its central portion than at its ends, and having an outer curved surface of the same radius as that of the brake drum, and an inner curved surface of the same radius as that of the brake shoe, the radius of the inner curved surface being smaller than that of the outer curved surface, the difference constituting a radius differential, the center of curvature of the outer and inner surfaces being displaced eccentrically by an amount equal to the difference between the greatest thickness of the segment and the said radius differential, and said segment when the brake shoe is in its final position with the segment worn to its fullest extent permissible, having the outer and inner curved surfaces eccentric to each other with the ends thicker than at the central portion, with the centre of curvature of the inner curved and outer curved surfaces of the segment not coinciding, and the center of curvature of the inner curved surface being disposed beyond the center of curvature of the outer surface when the segment is in its initial condition, and the center of curvature of the inner curved surface being disposed within the center of curvature of the outer curved surface when said segment is in worn out condition.

SYDNEY G. TILDEN.